United States Patent [19]

Cornou

[11] 4,249,357
[45] Feb. 10, 1981

[54] SYNTHETIC-RESIN ROAD MARKER AND METHOD OF MOLDING SAME

[75] Inventor: Jean Cornou, Verrieres le Buisson, France

[73] Assignee: Allibert Exploitation, Societe Anonyme, Grenoble, France

[21] Appl. No.: 946,603

[22] Filed: Sep. 28, 1978

[30] Foreign Application Priority Data

Oct. 12, 1977 [FR] France ................................ 77 31384

[51] Int. Cl.³ .................... G09F 15/00; E01F 9/10; E01F 9/06; B29B 7/20
[52] U.S. Cl. ....................................... 52/728; 40/608; 40/612; 116/63 R; 404/6; 404/9; 404/13; 428/67; 428/163; 428/167; 428/172; 264/318
[58] Field of Search .................. 428/36, 58, 67, 161, 428/162, 163, 167, 172; 404/6, 9, 12, 13; 40/608, 612; 116/63 R

[56] References Cited

U.S. PATENT DOCUMENTS

| | | | |
|---|---|---|---|
| 1,404,033 | 1/1922 | Kimmel et al. ........................ | 404/13 |
| 2,851,935 | 9/1958 | Weeks .................................... | 404/13 |
| 3,349,531 | 10/1967 | Watson ................................. | 404/9 X |
| 3,792,679 | 2/1974 | Duckett et al. ....................... | 40/608 |
| 3,851,615 | 12/1974 | Grundvig et al. ................... | 404/9 X |
| 3,965,596 | 6/1976 | Schröcksnadel .................... | 404/9 X |
| 4,025,675 | 5/1977 | Jonda .................................... | 428/36 |

FOREIGN PATENT DOCUMENTS

| | | | |
|---|---|---|---|
| 213284 | 6/1960 | Austria .................................... | 40/612 |
| 1165637 | 3/1964 | Fed. Rep. of Germany ............ | 40/612 |
| 1176171 | 8/1964 | Fed. Rep. of Germany ............ | 40/612 |
| 2334788 | 12/1977 | France ................................... | 404/6 |
| 2406696 | 6/1979 | France ................................... | 40/612 |
| 1098363 | 1/1968 | United Kingdom .................... | 404/14 |

*Primary Examiner*—William R. Dixon, Jr.
*Attorney, Agent, or Firm*—Karl F. Ross

[57] ABSTRACT

A tubular synthetic-resin body usable as a roadway marker comprises spaced upper and lower tubular parts interconnected by thin webs formed integrally with the upper and lower parts. A middle part of contrasting color lies between these upper and lower parts and has grooves receiving the connecting webs. Such a roadway marker is made by fitting the middle part over a core of a mold, and then injecting synthetic-resin material into the mold around this sleeve so as to form the upper and lower parts and the web.

3 Claims, 8 Drawing Figures

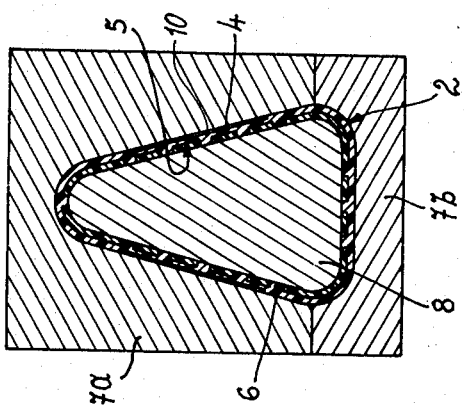
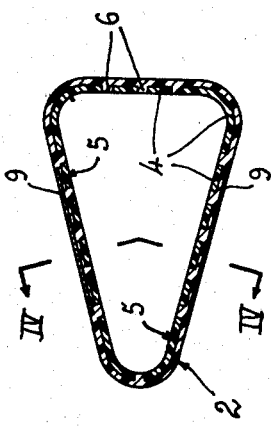
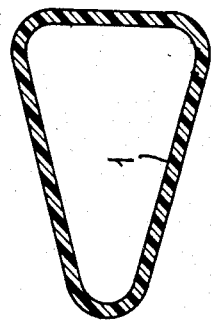
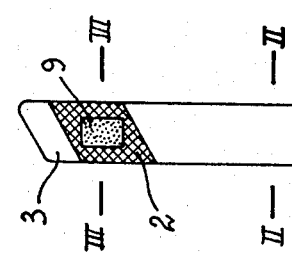
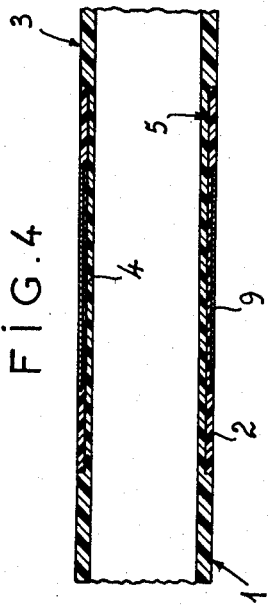
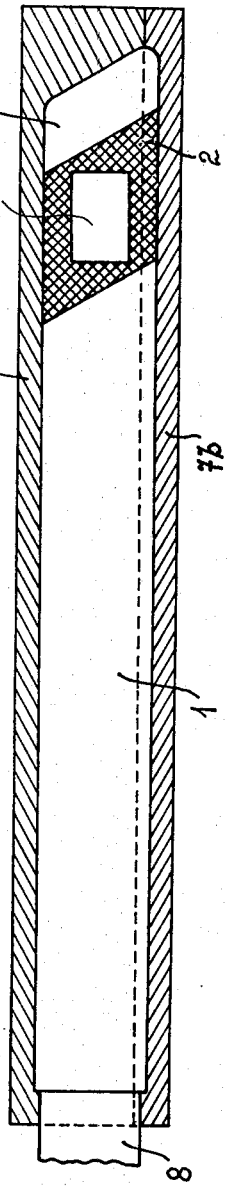

SYNTHETIC-RESIN ROAD MARKER AND METHOD OF MOLDING SAME

FIELD OF THE INVENTION

This invention relates to a synthetic-resin body and a method of molding same. More particularly this invention concerns a hollow road-marker post.

BACKGROUND OF THE INVENTION

A hollow synthetic-resin body usable as a road marker is known which has upper and lower parts separated by an intermediate part of contrasting color. Such a device is most easily made merely by painting a contrasting-color strip around the intermediate portion of an integral one-piece post. Such an arrangement has the considerable disadvantage that the painted stripe can fade or wear off, leaving a monotone post that is completely unsatisfactory as a lane marker or the like.

Another system uses three separate synthetic-resin parts that are fitted together. Such an arrangement maintains its contrasting colors well as the central part can be made of a differently tinted resin, but in time such arrangements frequently loosen and come apart. Such devices are particularly unsuitable as roadway markers where they are occasionally subject to considerable external forces that easily knock apart and destroy the three-part assemblies.

OBJECTS OF THE INVENTION

It is therefore an object of the present invention to provide an improved hollow synthetic-resin body usable as a road marker.

Another object is to provide such a body which will maintain good color contrast yet which is rugged.

A further object is to provide an improved method of making such a synthetic-resin body which allows its production at a low cost.

SUMMARY OF THE INVENTION

These objects are attained according to the instant invention in a synthetic-resin body comprising a tubular lower part, a tubular upper part spaced longitudinally from the lower part, a plurality of longitudinally extending strip webs integral with and interconnecting the upper and lower parts, and a tubular middle part or sleeve fitted between the upper and lower parts. This sleeve is formed internally with longitudinally extending grooves each of which snugly receives a respective one of the web strips.

Such an arrangement has the considerable advantage that the upper and lower parts, which normally are of the same color, are integral with each other. The middle part is a separate unit which can be tinted another color altogether. Even though the device is, however, constituted of two separate parts its disassembly is impossible without destroying it, as the upper and lower parts extend integrally via the web strips with each other and are permanently interconnected.

According to this invention such a roadway marker is molded by fitting into a tubular mold cavity, the sleeve constituting the middle part. This sleeve fits inside the cavity with its outer surface bearing against the outer mold part and its inner surface between its grooves fitting tightly against the inner mold part. A curable synthetic resin is injected into the mold cavity so as completely fill it to both sides of this sleeve and to also fill it at the grooves in the sleeve. This therefore forms the upper and lower parts integrally with each other around the middle part. During such formation the resin is under pressure so that the pressurized resin bearing against the sleeve from inside the grooves presses it tightly against the outer surface of the mold and prevents any of the liquid resin from entering between this outer surface and the mold.

The roadway marker according to this invention therefore has clearly delineated upper, middle and lower parts. There will be no running-together of the colors, as the middle part can be homogeneously dyed a different color from the resin forming the upper part, lower part, and interconnecting web strips.

BRIEF DESCRIPTION OF THE DRAWING

FIG. 1 is a side view of a body usable as a road marker in accordance with this invention;

FIGS. 2 and 3 are cross sections taken along lines II—II and III—III, respectively, of FIG. 1;

FIG. 4 is a longitudinal section taken along IV—IV of FIG. 3;

FIGS. 5 and 6 are cross and longitudinal sections, respectively, through the mold used in making the marker according to the instant invention.

SPECIFIC DESCRIPTION

As shown in FIGS. 1–4, 7, and 8 a post according to this invention basically comprises a tubular and triangular-section lower part 1, an intermediate part 2 of similar section, and a top part 3 also of triangular section, but with a closed upper end. The tubular intermediate part 2 (FIG. 8) is black, as indicated by the cross hatching in FIG. 1, whereas the upper and lower parts 1 and 3 are white.

Figure 8:
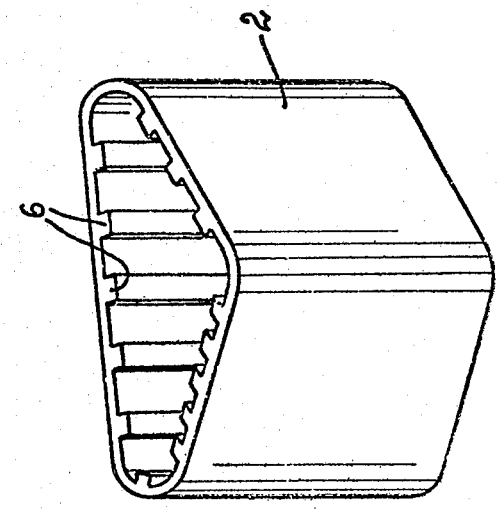
FIGS. 7 and 8 are perspective views of the parts of the road marker according to this invention.
Figure 7:
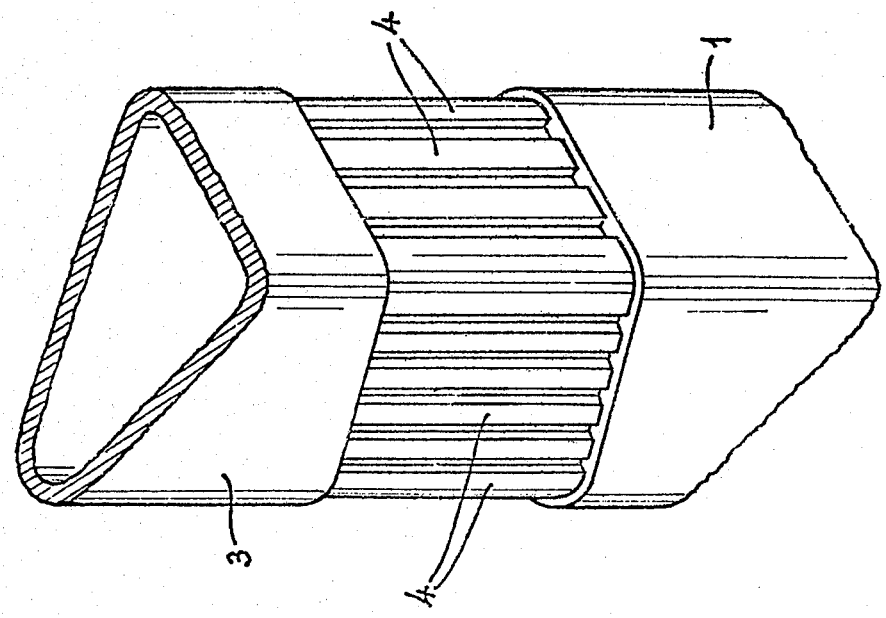

As better shown in FIGS. 3, 4, and 7 interconnecting the upper and lower parts 1 and 3 is a plurality of generally rectangular-section longitudinally extending webs 4 received in correspondingly sectioned grooves 5 formed on the inner surface of the intermediate part 2. The depth of these grooves 5 is approximately equal to half of the thickness of the part 2.

In addition the intermediate part 2, whose upper and lower ends extend at an angle of approximately 60° to the longitudinal axis of the body, is formed on each of its major sides with a rectangular depression or recess 10 (FIGS. 5 and 6) receiving a rectangular reflector 9.

To make such a body, which is ideally suitable for use as a roadway marker, a triangular section core 8 is fitted in an outer mold part constituted by two halves 7a and 7b and forming therewith a tubular mold cavity. The sleeve 2 is fitted over the core 8 and is so dimensioned that its outer surface lies snugly against the inner surface of the outer mold parts 7a and 7b and its inner surface between the grooves 5 lies snugly against the outer surface of the inner part 8. A synthetic resin is then injected under high pressure into the mold cavity thus formed so as to completely fill the space between the outer mold parts 7a and 7b and the inner mold part 8. This resin therefore forms the upper and lower parts 1 and 3 and the web strips 4 interconnecting them. In fact the resin, which may be a polyurethane, will normally be able to bond to the sleeve 3 so that in effect an integral assembly is created.

The body according to the instant invention is extremely rugged when completed, its three parts being so securely bonded and fitted together that even if it is struck by a car they are not likely to come apart. At the same time it is possible to produce such a road marker at relatively low cost. As the central sleeve 2, which may be made of a thermosetting resin whereas the balance may be made of a thermoplastic resin, is completely dyed a different color it will maintain the desired color contrast for its entire life.

I claim:

1. A synthetic-resin body comprising:

a synthetic-resin tubular lower part;

a synthetic-resin tubular upper part spaced longitudinally from said lower part and of substantially the same cross-section as said lower part;

a plurality of longitudinally extending strip webs unitary with and interconnecting said upper and lower parts; and a tubular middle part between said upper and lower parts, of substantially the same external cross-sectional shape as said upper and lower parts, and formed with inwardly open grooves complementary to and snugly receiving said webs.

2. The body defined in claim 1 wherein said middle and upper parts are of contrasting appearance.

3. The body defined in claim 1 wherein said upper part has a closed upper end.

* * * * *